United States Patent [19]
Ohkawachi et al.

[11] Patent Number: 5,717,014
[45] Date of Patent: Feb. 10, 1998

[54] POLYPHENYLENE ETHER RESIN COMPOSITION

[75] Inventors: Ichiro Ohkawachi; Kiyoji Takagi; Koji Nishida, all of Yokkaichi, Japan

[73] Assignee: Mitsubishi Chemical Corporation, Tokyo, Japan

[21] Appl. No.: 737,596

[22] PCT Filed: May 19, 1995

[86] PCT No.: PCT/JP95/00960

§ 371 Date: Nov. 25, 1996

§ 102(e) Date: Nov. 25, 1996

[87] PCT Pub. No.: WO95/32244

PCT Pub. Date: Nov. 30, 1995

[30] Foreign Application Priority Data

May 25, 1997 [JP] Japan ................................. 6-111227

[51] Int. Cl.$^6$ ................................................ C08K 5/49
[52] U.S. Cl. ............................ 524/118; 524/117; 524/119; 524/120; 524/128; 524/147; 524/148; 524/149; 524/151; 524/153; 524/505
[58] Field of Search ............................. 524/108, 117, 524/128, 118, 119, 120, 148, 149, 151, 153, 505, 147

[56] References Cited

U.S. PATENT DOCUMENTS

| | | | |
|---|---|---|---|
| 4,383,066 | 5/1983 | Sugio et al. | 524/128 X |
| 4,472,546 | 9/1984 | Sugio et al. | 524/128 X |
| 4,489,186 | 12/1984 | Sugio et al. | 524/151 |
| 5,061,753 | 10/1991 | Maruyama et al. | 525/68 |
| 5,420,184 | 5/1995 | Tsukahara et al. | 524/120 |
| 5,468,530 | 11/1995 | Gö tz et al. | 524/128 X |

*Primary Examiner*—Judy M. Reddick
*Attorney, Agent, or Firm*—Oblon, Spivak, McClelland, Maier and Neustadt P.C.

[57] ABSTRACT

A polyphenylene ether resin composition containing the following Components (A) to (D) according at the following formulation ratio.

(A) 50 to 99.5 parts by weight of a polyphenylene ether (B) 0.5 to 50 parts by weight of a partially hydrogenated aromatic alkenyl compound-conjugated diene block copolymer having a hydroxy group and based on 100 parts by weight of the above resin composition, (C) 0 to 950 parts by weight of a thermoplastic resin and (D) 0 to 10 parts by weight of a phosphorous acid triester.

11 Claims, No Drawings

POLYPHENYLENE ETHER RESIN COMPOSITION

TECHNICAL FIELD

This invention relates to a novel resin composition containing polyphenylene ether (hereinafter referred to as "PPE") as a main component and having excellent impact resistance, rigidity and heat resistance.

BACKGROUND ART

In the prior art, as a thermoplastic resin having excellent heat resistance and mechanical and electric properties, PPE obtained by subjecting 2,6-dimethylphenol to oxidative coupling polymerization has been known widely. However, the above PPE has high melting temperature and poor melt fluidity so that it has a drawback that molding processability is inferior. In order to remove such a drawback, various methods have been proposed, and there have been disclosed, for example, ① a method of formulating other resin into PPE, i.e., a method of formulating a styrene type resin into PPE (U.S. Pat. No. 3,383,435) and a method of formulating a polymer such as a polyamide, polyethylene terephthalate, polybutylene terephthalate, etc. into PPE (Japanese Patent Publication No. 997/1970, Japanese Provisional Patent Publications No. 159847/1984 and No. 75662/1974, etc.). However, in these methods, inherent characteristics, particularly heat resistance in a final composition are impaired in many cases.

Also, as a method for improving impact resistant strength by improving compatibility of a thermoplastic resin and PPE, there have been proposed ② a method of formulating a polyamide into PPE and further formulating, for example, a compound having a carbon-carbon double bond and a functional group such as a carboxyl group, an acid anhydride group, an acid amide group, an imide group, etc. as a third component (Japanese Provisional Patent Publication No. 26913/1981) and ③ a method of formulating a copolymer of a styrene type compound and an α,β-unsaturated dicarboxylic acid (Japanese Patent Publication No. 33614/1984), etc., but impact resistant strength is not sufficient, and further improvement has been demanded.

In order to improve the impact resistant strength of a multicomponent type polymer blend material of PPE and a thermoplastic resin such as a polyamide, etc., it is considered to mix and disperse an elastomer which is an impact resistant strength improver, and there have been proposed ④ a method in which in a three-component type material comprising PPE, a polyamide and an elastomer, when the melt viscosities of PPE and the polyamide satisfy a specific relation, said material is made a multilayer structure material in which the polyamide is a continuous phase, PPE is a primary dispersed phase and the elastomer is further dispersed in the primary dispersed phase of PPE (Japanese Provisional Patent Publication No. 273254/1987), ⑤ a thermoplastic resin composition which is a mixed composition containing a polyamide, PPE and a specific styrene type elastomer as a third component and has a structure that the polyamide forms a continuous phase and PPE exists as a dispersed phase having an average particle size of 0.1 to 10 µm in this continuous phase (Japanese Provisional Patent Publication No. 79258/1989), and ⑥ a method for improving impact resistance by formulating a block copolymer (a hydrogenated compound) having a specific molecular structure in PPE (Japanese Provisional Patent Publication No. 181552/1991, etc.).

Further, as a method for improving the impact resistant strength of a composition by using a block copolymer which is an impact resistant strength improver and selectively controlling a dispersed state in a PPE dispersed phase, there has been disclosed a method for improving impact resistant strength to a great extent and forming an ideal dispersion form by controlling the ratio of the melt viscosity of a block copolymer to the melt viscosity of PPE to a certain specific range (Japanese Provisional Patent Publication No. 84063/1991).

An object of the present invention is to provide a PPE resin composition which comprises PPE and a partially hydrogenated aromatic alkenyl compound-conjugated diene block copolymer having a hydroxy group and has excellent moldability, rigidity, heat resistance and impact resistant strength, to which a thermoplastic resin can be added, if necessary, which is used effectively for outer plates, etc. of automobiles such as a bonnet, an air spoiler, a bumper, a fender, a side protector, etc.

DISCLOSURE OF THE INVENTION

That is, the present invention is a PPE resin composition containing the following Components (A) to (D) at the following formulation ratio.

(A) 50 to 99.5 parts by weight of PPE (B) 0.5 to 50 parts by weight of a partially hydrogenated aromatic alkenyl compound-conjugated diene block copolymer having a hydroxy group based on the total amount of Components (A) and (B) being 100 parts by weight, (C) 0 to 950 parts by weight of a thermoplastic resin other than the above (A) and (B) and (D) 0 to 10 parts by weight of a phosphorous acid triester, particularly preferred is the above PPE resin composition in which the phosphorous acid triester is represented by the following formula (I).

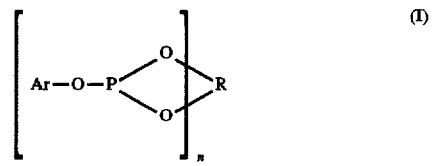

(wherein n represents 1 or 2, Ar represents an unsubstituted or substituted aryl group having 6 to 30 carbon atoms, and when n is 2, Ars may be the same or different, respectively. R represents an alkylene group having 2 to 18 carbon atoms or an arylene group when n is 1 and represents an alkanetetrayl group having 4 to 18 carbon atoms when n is 2. Also, Ar and R may contain an oxygen atom, a nitrogen atom, a sulfur atom or a halogen atom).

BEST MODE FOR PRACTICING THE INVENTION

In the following, the present invention is explained in detail.

(1) PPE (A)

PPE (A) to be used in the present invention is a homopolymer or copolymer having a structure represented by the formula (II):

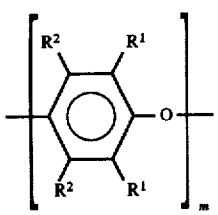

(II)

(wherein $R^1$s each represent a halogen atom, a primary or secondary alkyl group, an aryl group, an aminoalkyl group, a hydrocarbonoxy group or a halohydrocarbonoxy group, $R^2$s each represent a hydrogen atom, a halogen atom, a primary or secondary alkyl group, an aryl group, a haloalkyl group, a hydrocarbonoxy group or a halohydrocarbonoxy group, and m represents an integer of 10 or more).

As a preferred example of the primary alkyl group of $R^1$ and $R^2$, there may be mentioned one having 1 to 8 carbon atoms, for example, methyl, ethyl, n-propyl, n-butyl, n-amyl, isoamyl, 2-methylbutyl, n-hexyl, 2,3-dimethylbutyl, 2-, 3- or 4-methylpentyl or heptyl. As a preferred example of the secondary alkyl group, there may be mentioned one having 3 to 6 carbon atoms, for example, isopropyl, sec-butyl or 1-ethylpropyl. In many cases, $R^1$ is an alkyl group or a phenyl group, particularly an alkyl group having 1 to 4 carbon atoms, and $R^2$ is a hydrogen atom.

As a preferred homopolymer of PPE, there may be mentioned, for example, one comprising a 2,6-dimethyl-1,4-phenylene ether unit. As a preferred copolymer, there may be mentioned a random copolymer comprising a combination of the above unit and a 2,3,6-trimethyl-1,4-phenylene ether unit. A large number of preferred homopolymers or random copolymers have been described in patents and literatures. For example, PPE including a molecular structure portion which improves characteristics such as molecular weight, melt viscosity and/or impact resistant strength, etc. is also preferred.

PPE (A) to be used here is preferably one having an intrinsic viscosity measured at 30° C. in chloroform of 0.2 to 0.8 dl/g. More preferably, it is one having an intrinsic viscosity of 0.25 to 0.7 dl/g, particularly preferably one having an intrinsic viscosity of 0.3 to 0.6 dl/g. If the intrinsic viscosity of PPE (A) is less than 0.2 dl/g, the impact resistance of a composition is insufficient, while if it exceeds 0.8 dl/g, a gel portion is large to cause a problem in appearance of a molded product.

(2) Partially hydrogenated aromatic alkenyl compound-conjugated diene block copolymer (B) having a hydroxy group The partially hydrogenated aromatic alkenyl compound-conjugated diene block copolymer (B) having a hydroxy group to be used in the present invention comprises one or more of a polymer block (a) of an aromatic alkenyl compound and one or more of a conjugated diene compound polymer block (b), and the number average molecular weight of the whole material is preferably in the range of 10,000 to 300,000, more preferably in the range of 15,000 to 280,000. If the number average molecular weight is less than 10,000, mechanical properties such as breaking strength, elongation, etc. of a block copolymer are lowered, and when a composition is prepared, strength thereof is lowered undesirably. Also, if the number average molecular weight exceeds 300,000, processability is worsened, and the miscibility with a resin having a polar group is not good, whereby a composition having sufficient characteristics cannot be obtained. In the block copolymer (B), the content of the polymer block (a) is 5 to 70% by weight, and one in which the configuration of the block (a) and the block (b) takes a linear structure or a branched structure or takes the so-called tereblock structure is included.

Also, in a part of these structures, a random chain derived from random copolymerization of an aromatic alkenyl compound and a conjugated diene may be included. Among these, a diblock (a-b block), a triblock (a-b-a' block), a tetra-block (a-b-a'-b' block) or a pentablock (a-b-a'-b'-a" block, b-a-b'-a'-b" block) forming a linear structure, or one forming a linear structure including one having the total number of a and b blocks being 6 to 10 is more preferred. Among these, a diblock, a triblock and a tetra-block are further preferred, and a block having a form of (a-b-a') is most preferred. (a), (a') and (a") shown here are hydrogenated blocks in which the same or different aromatic alkenyl compounds are polymerized, and (b), (b') and (b") are hydrogenated blocks in which the same or different conjugated dienes are polymerized.

Also, it is preferably a hydrogenated block copolymer obtained by hydrogenating 25% or less of aromatic double bonds of the whole polymer block (a) and at least 70% or more of aliphatic double bonds of the polymer block (b) of the block copolymer in which both of the number average molecular weights of the above polymer blocks (a) and (b) are 2,500 or more.

As a specific example of the aromatic alkenyl compound constituting the block (a), there may be mentioned styrene, α-methylstyrene, paramethylstyrene, 3-methylstyrene, 4-propylstyrene, 4-cyclohexylstyrene, 4-dodecylstyrene, 2-ethyl-4-benzylstyrene, 4-(phenylbutyl)styrene, divinylbenzene, bromostyrene, chlorostyrene, vinyltoluene, vinylxylene, 1-vinylnaphthalene, etc., and these can be also used in combination. Among these, styrene, paramethylstyrene, α-methylstyrene, vinyltoluene and vinylxylene are preferred, and styrene is more preferred.

The number average molecular weight of the block (a) is preferably in the range of 2,500 to 40,000, more preferably in the range of 5,000 to 20,000. If the molecular weight is less than 2,500, characteristics as a composition is lowered, while if it exceeds 40,000, melt viscosity becomes too high, and mixing with other resin is not good, whereby a composition having sufficient uniformity cannot be obtained. Also, the ratio of this polymer block (a) of the aromatic alkenyl compound in the block copolymer (B) is preferably in the range of 5 to 50% by weight, more preferably 10 to 30% by weight. If this ratio is less than 5% by weight, the mechanical properties of the block copolymer (B) are insufficient, while if it exceeds 50% by weight, viscosity is significantly heightened to make mixing and processing, etc. difficult.

Also, as a specific example of the conjugated diene constituting the block (b), there may be mentioned 1,3-butadiene, 2-methyl-1,3-butadiene, 2,3-dimethyl-1,3-butadiene, 1,3-pentadiene, isoprene, etc., and 1,3-butadiene, isoprene or a combination of 1,3-butadiene and isoprene is particularly preferred. A copolymerized state when a combination of isoprene-butadiene is used may be either random, block or tapered.

The content of 3,4 bonds and 1,2 bonds (hereinafter, these are sometimes referred to as "the vinyl bond content") of the block (b) is preferably 30% to 100%, more preferably 50% to 90%. If the vinyl bond content is less than 30%, sufficient impact resistance cannot be obtained in an ordinary use temperature region undesirabty. Also, the number average molecular weight of the block (b) is preferably in the range of 5,000 to 200,000, more preferably 10,000 to 100,000. If the number average molecular weight is less than 5,000, modulus of elasticity is impaired undesirably, while it is more than 200,000, fluidity is worsened undesirably.

The block copolymer to be used in the present invention is obtained by the following various methods.

Firstly, as to preparation of the block copolymer, there may be mentioned (i) a method in which an aromatic alkenyl compound is polymerized by using an alkyl lithium compound as an initiator and subsequently, isoprene, butadiene or isoprene-butadiene is polymerized successively, (ii) a method in which an aromatic alkenyl compound is polymerized, then, isoprene, butadiene or isoprene-butadiene is polymerized subsequently and these are subjected to coupling by a coupling agent, (iii) a method in which isoprene, butadiene or isoprene-butadiene is polymerized by using a dilithium compound as an initiator and subsequently an aromatic alkenyl compound is polymerized successively, etc.

As an example of the alkyl lithium compound, there may be mentioned, for example, a lithium compound having an alkyl group with 1 to 10 carbon atoms, and particularly methyl lithium, ethyl lithium, pentyl lithium and butyl lithium are preferred. As an example of the coupling agent, there may be mentioned, for example, dichloromethane, dibromomethane, dichloroethane, dibromoethane, dibromobenzene, etc. As an example of the dilithium compound, there may be mentioned, for example, naphthalene dilithium, dilithiohexylbenzene, etc. The amount to be used is of a property that it is determined by desired molecular weight, but based on 100 parts by weight of all of the monomers used for polymerization, the initiator is about 0.01 to 0.2 part by weight, and when the coupling agent is used, it is used in the range of about 0.04 to 0.8 part by weight.

In order that the isoprene, butadiene or isoprene-butadiene portion has a microstructure having a vinyl bond content of 30% or more, a Lewis base is used as a cocatalyst when isoprene, butadiene or isoprene-butadiene is polymerized. As an example of the Lewis base, there may be mentioned ethers such as dimethyl ether, diethyl ether, tetrahydrofuran, etc.; glycol ethers such as ethylene glycol dimethyl ether, diethylene glycol dimethyl ether, etc.; an amine type compound such as triethylamine, N,N,N',N'-tetramethylethylenediamine (TMDEA), N-methylmorpholine, etc. and others.

The amount of these Lewis bases to be used is used in the range of about 0.1 to 1,000 times based on the molar number of lithium which is a polymerization initiator. At the time of polymerization, in order to facilitate control, it is preferred to use a solvent. As the solvent, an organic solvent which is inert to the polymerization initiator is used. An aliphatic, alicyclic or aromatic hydrocarbon having 6 to 12 carbon atoms is particularly preferably used. As an example thereof, there may be mentioned hexane, heptane, cyclohexane, methylcyclohexane, benzene, etc. The polymerization is carried out at a temperature range of 0° to 80° C. in the range of 0.5 to 50 hours even when either polymerization method is used.

The block copolymer can be hydrogenated by a known method. In the hydrogenation reaction, a method in which molecular state hydrogen is reacted by a known hydrogenation catalyst in a state that it is dissolved in a solvent which is inert to a hydrogenation catalyst and the reaction is preferred. As the catalyst to be used, there may be used a non-uniform type catalyst such as one in which Raney nickel or a metal such as Pt, Pd, Ru, Rh, Ni, etc. is carried on a carrier such as carbon, alumina, diatomaceous earth, etc. and others, or a Ziegler type catalyst comprising a combination of a transition metal and an alkylaluminum compound or an alkyl lithium compound, etc., and others. The reaction is carried out generally under a hydrogen pressure of ordinary pressure to 200 kg/cm$^2$ at a reaction temperature of ordinary temperature to 250° C. for a reaction time in the range of 0.1 to 100 hours. The block copolymer after the reaction can be obtained by adding the reaction mixture to methanol or the like to precipitate the copolymer and then drying it under heating or reduced pressure, or pouring the reaction mixture into boiling water to remove the solvent by azeotropy and then drying the residue under heating or reduced pressure.

The hydrogenation rate is determined depending on the level of required physical properties, but when heat resistance and weather resistance are regarded as important, it is preferably 50% or more, and it is further preferred to carry out hydrogenation at a rate of 70% or more.

In the present invention, the block copolymer having a hydroxy group may be used alone or as a mixture with a block copolymer containing no hydroxy group, but the content of a compound having a hydroxy group after mixing is preferably 0.1% by weight or more, more preferably 0.50% by weight or more, particularly preferably 1% by weight or more based on the weight of the whole block copolymer. If the content of the compound having a hydroxy group after mixing is less than 0.1% by weight, the impact resistance of a composition is unsatisfactory.

The above block copolymer having a hydroxy group can be prepared by various methods, which is not particularly limited.

There may be mentioned, for example, polymerization of an aromatic alkenyl compound having a hydroxy group and a conjugated diene; graft polymerization of an unsaturated compound having a hydroxy group to a block copolymer; a method of forming a hydroxy group by oxidation or hydrolysis or the like of a polar group in a polymer; or a method for forming a hydroxy group by polymerizing a conjugated diene by anion polymerization and reacting, for example, a monoepoxy compound, formaldehyde, acetaldehyde, acetone, halogenoalkylene oxide or polyepoxide or an unsaturated compound having a hydroxy group, etc. or a styryl lithium group with, for example, a living polymer having a structure that an alkali metal obtained by using an alkali metal salt or an organic alkali metal compound is bonded, in the presence of an anion catalyst, etc. Preferred is a method for introducing a hydroxy group by reacting an unsaturated compound having a hydroxy group with a block copolymer existing as a living polymer having a structure that an alkali metal is bonded to one terminal.

As the unsaturated compound having a hydroxy group to be used here, there may be mentioned, for example, methacrylates or acrylates such as 2-hydroxymethyl methacrylate, 2-hydroxymethyl acrylate 2-hydroxyethyl acrylate, 2-hydroxyethyl methacrylate, 2-hydroxypropyl methacrylate, 2-hydroxypropyl acrylate, 3-hydroxypropyl methacrylate, 3-hydroxypropyl acrylate, 2-hydroxybutyl methacrylate, 2-hydroxybutyl acrylate, diethylene glycol monomethacrylate, etc.; an unsaturated alcohol such as allyl alcohol, 9-decen-1-ol, 10-undecen-1-ol, etc.; vinyl ethers such as 2-hydroxyethyl vinyl ether, etc.; allyl ethers such as 2-hydroxyethyl allyl ether, etc.; and styrenes such as α-hydroxymethylpropylstyrene, α-hydroxyethylstyrene, α-hydroxypropylstyrene, α-hydroxybutylstyrene, etc.

Among these, (meth)acrylates and styrenes are preferred, further, 2-hydroxyethyl acrylate, 2-hydroxyethyl methacrylate, α-hydroxypropylstyrene, α-hydroxybutylstyrene, etc. are more preferred, and α-hydroxypropylstyrene and α-hydroxybutylstyrene are particularly preferred.

In the block copolymer having a hydroxy group, in addition to these conjugated dienes, a small amount of a lower olefin type hydrocarbon such as ethylene, propylene, 1-butene, etc., dicyclopentadiene or non-conjugated dienes may be contained.

(3) Thermoplastic Resin (C)

As the thermoplastic resin to be used in the present invention, there may be mentioned, for example, a crystalline or non-crystalline thermoplastic resin such as a polyamide, a polyolefin, a polyphenylene sulfide, a saturated polyester, a styrene type resin, a polycarbonate, etc.

The crystalline thermoplastic resin has a clear crystal structure or crystallizable molecular structure and non-glass-like characteristics and shows a clear melting point having measurable heat of melting. The melting point and heat of melting can be measured by using a differential scanning calorimeter (for example, DSC-11 manufactured by PERKIN-ELMER Co.). By using this device, measurement can be carried out by heating a sample to a temperature which is an estimated melting point or higher at a rate of 10° C. per 1 minute, cooling the sample to 20° C. by lowering temperature at a rate of 10° C. per 1 minute, leaving it to stand for about 1 minute and then heating it again by elevating temperature at a rate of 10° C. per 1 minute. With respect to heat of melting, among the values measured in cycles of elevating temperature and lowering temperature, a value which is the constant value within the experimental error range is used. The crystalline thermoplastic resin in the present invention is defined to have heat of melting measured by the above method of 1 calorie/gram or more.

Also, as the non-crystalline thermoplastic resin, a non-crystalline thermoplastic resin having a glass transition temperature of 50° C. or higher is preferred. Also, the non-crystalline thermoplastic resin refers to one which does not show a clear melting point nor measurable heat of melting, but in the present invention, it includes one showing some crystallizability when it is slowly cooled and is defined to have heat of melting measured by the differential scanning calorimeter of less than 1 calorie/gram.

As a preferred crystalline thermoplastic resin to be used in the present invention, there may be mentioned, for example, a polyamide, a polyolefin, a saturated polyester, a polyacetal, a fluorine resin, a polyether ether ketone, etc., and specific examples are shown below.

(i) The polyamide to be used in the present invention is one which has a —CO—NH— bond in a polymer main chain and can be melted by heating. As a representative example thereof, there may be mentioned nylon 4, nylon 6, nylon 6,6, nylon 4,6, nylon 12 and nylon 6,10 (all trade names), etc., and other known low crystallinity or non-crystalline polyamide comprising a monomer component such as aromatic diamine, aromatic dicarboxylic acid, etc. and others may be also used. A preferred polyamide is nylon 6 or nylon 6,6, and among them, nylon 6 is particularly preferred.

The polyamide to be used in the present invention is preferably one having a relative viscosity (measured in 98% conc. sulfuric acid at 25° C.) of 2.0 to 8.0.

(ii) The polyolefin to be used in the present invention is, for example, a homopolymer of an α-olefin, such as ethylene, propylene, butene-1, pentene-1, hexene-1, 3-methylbutene-1, 4-methylpentene-1, heptene-1, octene-1, etc., a random or block copolymer of these α-olefins, a random, graft or block copolymer of more than a half weight of the above α-olefin and other unsaturated monomer, or those obtained by subjecting these polyolefins to treatment such as oxidation, halogenation, sulfonation or the like, and one showing crystallizability derived from a polyolefin at least partially, etc., and the crystallinity is preferably 20% or more. These may be used singly or in combination of two or more without any problem.

Here, as an example of the other unsaturated monomer, there may be mentioned an unsaturated carboxylic acid or a derivative thereof such as acrylic acid, methacrylic acid, maleic acid, itaconic acid, methyl acrylate, ethyl acrylate, methyl methacrylate, maleic anhydride, arylmaleic acid imide, alkylmaleic acid imide, etc.; a vinyl ester such as vinyl acetate, vinyl butyrate, etc.; an aromatic vinyl compound such as styrene, methylstyrene, etc.; a vinyl silane such as vinyl trimethylmethoxysilane, γ-methacryloyloxypropyltrimethoxysilane, etc.; a non-conjugated diene such as dicyclopentadiene, 4-ethylidene-2-norbornene, etc. and others.

The polyolefin to be used in the present invention can be obtained by polymerization or modification, etc. by a known method, but one selected suitably from commercially available products may be used.

Among these, a homopolymer such as propylene, butene-1, 3-methylbutene-1 and 4-methylpentene-1, etc. or a copolymer containing more than a half weight of the above is preferred, and among them, a crystalline propylene type polymer, i.e., a crystalline propylene homopolymer, a crystalline propylene-α-olefin block or random copolymer, or a mixture of the above crystalline propylene polymer and an α-olefin type rubber, i.e., a rubbery copolymer comprising plural α-olefins, or a copolymer of plural α-olefins and a non-conjugated diene is particularly preferred from the point of the balance of mechanical physical properties.

The melt flow rate (hereinafter referred to as "MFR", 230° C., a load of 2.16 kg) of these crystalline propylene type copolymers or a mixture containing these and the α-olefin type rubber is preferably in the range of 0.01 to 250 g/10 minutes, more preferably in the range of 0.05 to 150 g/10 minutes, particularly preferably in the range of 0.1 to 50 g/10 minutes. If MFR is in the range which is lower than this, a problem in molding processability is caused, while if it is in the range which is higher than this, the level of the balance of mechanical physical properties is low undesirably.

Among these, one having MFR in this range by changing a molecular weight by heat treatment in the presence of a radical generator, for example, an organic peroxide, etc. is also included.

(iii) As an example of the crystalline thermoplastic resin to be used in the present invention, there may be mentioned a saturated polyester, and various polyesters can be used.

For example, there may be mentioned a thermoplastic polyester prepared by condensing a dicarboxylic acid or a lower alkyl ester thereof, an acid halide or an acid anhydride derivative and a glycol or a divalent phenol according to a common method.

As a specific example of the aromatic or aliphatic dicarboxylic acid which is suitable for preparing this thermoplastic polyester, there may be mentioned oxalic acid, malonic acid, succinic acid, glutaric acid, adipic acid, suberic acid, azelaic acid, sebacic acid, terephthalic acid, isophthalic acid, p,p'-dicarboxydiphenyl-sulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid or 2,7-naphthalenedicarboxylic acid, etc., or a mixture of these carboxylic acids.

Also, the aliphatic glycol which is suitable for preparing the thermoplastic polyester may be exemplified by a straight atkylene glycol having 2 to 12 carbon atoms, for example, ethylene glycol, 1,3-propylene glycol, 1,4-butanediol, 1,6-hexanediol, 1,12-dodecanediol, etc. Also, the aromatic glycol compound may be exemplified by p-xylylene glycol, and as the divalent phenol, there may be mentioned pyrocatechol, resorcinol, hydroquinone or alkyl-substituted derivatives of these compounds. As other suitable glycol, there may be also mentioned 1,4-cyclohexanedimethanol.

As other preferred thermoplastic polyester, there may be also mentioned, for example, a polyester obtained by ring opening polymerization of a lactone such as polypivalolactone, poly(ε-caprolactone), etc.

Further, as other preferred thermoplastic polyester, there may be mentioned a polyester as a polymer (Thermotropic Liquid Crystal Polymer; TLCP) which forms liquid crystal in a melted state. As the polyester belonging to this classification, X7G of Eastman Kodak Co., Xydar of Datoco Co., Ekonol of Sumitomo Kagaku Co., Vectra of Celanese Co., etc. are representative commercially available products.

Among the thermoplastic polyesters described above, polyethylene terephthalate (PET), polybutylene terephthalate (PBT), polyethylene naphthalate (PEN), poly(1,4-cyclohexanedimethylene terephthalate)(PCT) or a liquid crystal polyester, etc. are thermoplastic polyesters which are suitable for the resin composition of the present invention.

With respect to the viscosity of the thermoplastic polyester to be used here, the intrinsic viscosity measured at 20° C. in a mixed solution of phenol/1,1,2,2-tetrachloroethane= 60/40% by weight is preferably in the range of 0.5 to 5.0 dl/g. It is more preferably 1.0 to 4.0 dl/g, particularly preferably 2.0 to 3.5 dl/g. If the intrinsic viscosity is less than 0.5 dl/g, impact resistance is insufficient, while if it exceeds 5.0 dl/g, there is a problem in moldability.

(iv) As an example of the crystalline thermoplastic resin other than the above, there may be mentioned a polyacetal (POM), a fluorine resin, a polyether ether ketone, etc., preferably a thermoplastic polyester, a polyamide and a polyolefin, more preferably a thermoplastic polyester and a polyamide.

As a suitable non-crystalline thermoplastic resin to be used in the present invention, there may be mentioned, for example, a styrene type resin, a polycarbonate, a styrene-maleic acid (SMA) copolymer resin, an aromatic polysulfone, an aromatic polyether sulfone, an aromatic non-crystalline polyamide, a silicon resin, a polyether imide, a poly-(alkyl) acrylate, etc., and specific examples are shown below.

(v) As a specific example of the styrene type resin to be used in the present invention, there may be mentioned polystyrene, (GPPS), high impact polystyrene (HIPS), an acrylonitrile-styrene copolymer (AS), ABS, MBS, MABS, a maleic anhydride-styrene copolymer (MAS), and other aromatic alkenyl type polymers represented by an acrylonitrile-chlorine type polyolefin-styrene copolymer disclosed in Japanese Provisional Patent Publication No. 48547/1973, etc.

(vi) As a specific example of the polycarbonate to be used in the present invention, there may be mentioned an aromatic polycarbonate, an aliphatic polycarbonate, an aromatic-aliphatic polycarbonate, etc., and among them, aromatic polycarbonates comprising bisphenols such as 2,2-bis(4-oxyphenyl)alkane type, bis(4-oxyphenyl)ether type, bis(4-oxyphenyl)sulfone, sulfide or sulfoxide type, etc. are preferred. Also, a polycarbonate comprising bisphenols substituted by a halogen may be also used, if necessary.

The molecular weight of the polycarbonate is not limited, but it is generally one having a number average molecular weight of 10,000 or more, preferably 20,000 to 40,000.

(vii) As a non-crystalline thermoplastic resin other than the above, there may be mentioned a SMA resin, an aromatic polysulfone, an aromatic polyether sulfone, an aromatic non-crystalline polyamide, a silicon resin, a polyether imide, a poly(alkyl) acrylate, etc. It is preferably a polyamide, a saturated polyester, a styrene type resin, a polycarbonate and a polyolefin, more preferably a polyamide, a saturated polyester and a styrene type resin, particularly preferably a polyamide.

The thermoplastic resins to be used in the present invention may be used in combination of two or more.

(4) Phosphorous Acid Triester (D)

As the phosphorous acid triester (D) to be used in the present invention, any one may be used so long as the effect of the present application can be accomplished thereby.

As this phosphorous acid triester (D), there may be mentioned, for example, compounds represented by the following formulae (III) and (IV), etc., and among these, a compound represented by the formula (IV) is preferred.

(wherein $R^3$s each independently represent an alkyl group having 1 to 20 carbon atoms or a substituted or unsubstituted aryl group having 6 to 30 carbon atoms. Also, $R^3$ may contain an oxygen atom, a nitrogen atom, a sulfur atom or a halogen atom)

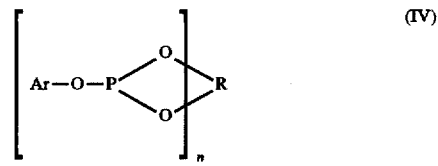

(wherein the definitions of n, $R^3$ and R are the same as described above)

Here, as $R^3$, there may be mentioned, for example, an alkyl group having 1 to 20 carbon atoms such as methyl, ethyl, propyl, octyl, isooctyl, isodecyl, decyl, stearyl and lauryl, etc. or an aryl group which may be substituted by 1 to 3 straight or branched alkyl groups having 1 to 10 carbon atoms, such as phenyl, 2-, 3- or 4-methylphenyl, 2,4- or 2,6-dimethylphenyl, 2,3,6-trimethylphenyl, 2-, 3- or 4-ethylphenyl, 2,4- or 2,6-diethylphenyl, 2,3,6-triethylphenyl, 2-, 3- or 4-tert-butylphenyl, 2,4- or 2,6-di-tert-butylphenyl, 2,6-di-tert-butyl-6-methylphenyl, 2,6-di-tert-butyl-6-ethylphenyl, octylphenyl, isooctylphenyl, 2-, 3- or 4-nonylphenyl and 2,4-dinonylphenyl, etc., and an aryl group such as biphenyl, naphthyl, etc., and among them, substituted or unsubstituted aryl groups are particularly preferred.

As an example of R, when n is 1 in the formula (IV), there may be mentioned a 1,2-phenylene group; and a polymethylene group such as ethylene, propylene, trimethylene, tetramethylene, hexamethylene, etc., and when n is 2, there may be mentioned a tetrayl group having a pentaerythrityl structure shown in the formula (V), etc.

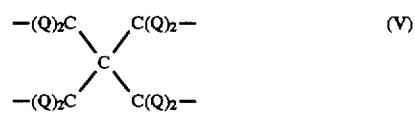

(wherein Qs each independently represent a hydrogen atom or an alkyl group having 1 to 6 carbon atoms)

Among these, as one which is preferred as the phosphorous acid triester (D), there may be mentioned trioctyl phosphite, tridecyl phosphite, trilauryl phosphite, tristearyl phosphite, triisooctyl phosphite, tris(nonylphenyl) phosphite, tris(2,4-dinonylphenyl) phosphite, tris(2,4-di-tert-butylphenyl) phosphite, triphenyl phosphite, tris(octylphenyl) phosphite, diphenylisooctyl phosphite, diphenylisodecyl phosphite, octyldiphenyl phosphite, dilaurylphenyl phosphite, diisodecylphenyl phosphite, bis(nonylphenyl)-phenyl phosphite, diisooctylphenyl phosphite, diisodecylpentaerythritol diphosphite, dilaurylpentaerythritol diphosphite, distearylpentaerythritol diphosphite, (phenyl)-(1,3-propanediol) phosphite, (4-methylphenyl) (1,3-propanediol) phosphite, (2,6-dimethylphenyl) (1,3-propanediol) phosphite, (4-tert-butylphenyl) (1,3-propanediol) phosphite, (2,4-di-tert-butylphenyl) (1,3-propanediol) phosphite, (2,6-di-tert-butylphenyl) (1,3-propanediol) phosphite, (2,6-di-tert-butyl-4-methylphenyl) (1,3-propanediol) phosphite, (phenyl) (1,2-ethanediol) phosphite, (4-methylphenyl) (1,2-ethanediol) phosphite, (2,6-dimethylphenyl)(1,2-ethanediol) phosphite, (4-tert-butylphenyl)(1,2-ethanediol) phosphite, (2,4-di-tert-butylphenyl)(1,2-ethanediol) phosphite, (2,6-di-tert-butylphenyl) (1,2-ethanediol) phosphite, (2,6-di-tert-butyl-4-methylphenyl) (1,2-ethanediol) phosphite, (2,6-di-tert-butyl-4-methylphenyl) (1,4-butanediol) phosphite, etc., diphenylpentaerythritol diphosphite, bis(2-methytphenyl)pentaerythritol diphosphite, bis(3-methylphenyl)pentaerythritol diphosphite, bis(4-methylphenyl)pentaerythritol diphosphite, bis(2,4-dimethylphenyl)pentaerythritol diphosphite, bis(2,6-dimethylphenyl)pentaerythritol diphosphite, bis(2,3,6-trimethylphenyl)pentaerythritol diphosphite, bis(2-tert-butylphenyl)pentaerythritol diphosphite, bis(3-tert-butylphenyl)pentaerythritol diphosphite, bis(4-tert-butylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis(nonylphenyl)pentaerythritol diphosphite, bis(biphenyl)pentaerythritol diphosphite, dinaphthylpentaerythritol diphosphite, etc.

Also, as a more preferred phosphorous acid triester in the formula (I) in which n is 2, there may be mentioned bis-(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, etc.

The composition of the present invention may contain a compound generated by decomposition such as hydrolysis or thermal decomposition, etc. of these phosphorous acid triesters.

(5) Composition Ratio of the Constituting Components

The composition ratio of Components (A) and (B) of the present invention is as shown below based on the total 100 parts by weight of Component (A) and Component (B).

Component (A) is 50 to 99.5 parts by weight, preferably 70 to 99 parts by weight, more preferably 75 to 99 parts by weight. If Component (A) is less than 50 parts by weight, heat resistance, impact resistance, coatability and melt tension are unsatisfactory, while if it exceeds 99.5 parts by weight, appearance, impact resistance and melt tension of a molded product become unsatisfactory.

Component (B) is 0.5 to 50 parts by weight, preferably 1 to 30 parts by weight, more preferably 1 to 25 parts by weight. If Component (B) is less than 0.5 part by weight, sufficient impact resistance and coatability cannot be obtained, while if it exceeds 50 parts by weight, heat resistance becomes unsatisfactory.

Also, Component (C) is 0 to 950 parts by weight, preferably 25 to 850 parts by weight, more preferably 40 to 800 parts by weight. If Component (C) exceeds 950 parts by weight, heat resistance, impact resistance, coatability and melt tension become unsatisfactory.

The amount of the phosphorous acid triester of Component (D) to be formulated is 0 to 10 parts by weight, preferably 0.1 to 8 parts by weight, more preferably 0.5 to 5 parts by weight. If it exceeds 10 parts by weight, a problem in heat resistance and appearance of a molded product may be caused undesirably.

(6) Additional Components

To the resin composition to be prepared in the present invention, other components other than Components (A) to (D) described above can be added. As additional components, there may be used, for example, 0.01 to 5% by weight of an antioxidant, a weather resistance improver, alkaline soap, metal soap or hydrotalcite; 5 to 30% by weight of a plasticizer or a fluidity improver; 0.5 to 2% by weight of a nucleating agent; and 3 to 15% by weight of a flame retardant. Also, it is effective for improving rigidity, heat resistance, dimensional precision, etc. to add 5 to 50% by weight of an organic filler, an inorganic filler, a reinforcing agent, particularly glass fiber, mica, talc, wallastonite, potassium titanate, calcium carbonate, silica, etc. Further, 0.5 to 5% by weight of a coloring agent, a dispersant thereof, etc. may be formulated.

Also, in order to further heighten the effect of Component (D), one or more known aids for subjecting to transesterification of the phosphorous acid triester can be used. As this aid, there may be mentioned, for example, a halogenated alkali metal salt such as lithium chloride; an amide compound such as N-methylpyrrolidone; amines such as pyridine, trioctylamine, etc., and others. The amount of these to be added is preferably 0.1 to 5 in terms of a molar ratio to a phosphorus atom.

(7) Preparation Method of the Composition

Preparation of the resin composition of the present invention is not limited to a specific method, but a melting and kneading method is preferred. As this method, there may be suitably used a kneading method which is generally used practically for a thermoplastic resin.

For example, in order to mix Component (A) and Component (B), after (C) and (D) are added, if necessary, and together with the above-mentioned additional components, if further necessary, they are mixed uniformly by using a Henschel mixer, ribbon blender, a twin-cylinder mixer (a V-shaped blender) or the like, and then the mixture is kneaded by a single axial or plural axial kneading extruder, a roll, a Banbury mixer, a Laboplasto mill (a Brabender Plastograph) or the like.

The respective components including the above-mentioned additional components may be fed at one time or may be fed successively to a kneader. Also, a mixture obtained by previously mixing 2 or more components selected from the respective components including the above-mentioned additional components may be used.

Also, when the phosphorous acid triester (D) is used, with respect to these kneading methods, no step of removing an unreacted or reacted phosphorus compound is required.

The kneading temperature and the kneading time can be optionally selected depending on the conditions such as the desired production amount of PPE (A) and the partially hydrogenated aromatic alkenyl compound-conjugated diene block copolymer (B) having a hydroxy group, the kind of a kneader, etc., but the kneading temperature is preferably 150° to 350° C., and the kneading time is preferably 20 minutes or shorter. If the kneading temperature exceeds 350° C. or the kneading time exceeds 20 minutes, deterioration by heat of PPE (A), the partially hydrogenated aromatic alkenyl compound-conjugated diene block copolymer (B) having a hydroxy group or the phosphorous acid triester (D) occurs, whereby lowering of physical properties and worsening of appearance of a molded product may be caused.

The pressure at the time of kneading is not particularly limited, and under any condition of ordinary pressure, pressurization or reduced pressure, PPE (A) and the partially hydrogenated alkenyl aromatic compound-conjugated diene block copolymer (B) having a hydroxy group, or these and the phosphorous acid triester (D) can be mixed, and a resin composition having excellent characteristics can be also obtained.

(8) Molding Method of the Composition

A molding processing method of the resin composition of the present invention is not particularly limited, and there may be suitably used a molding method generally used for a thermoplastic resin, i.e. various molding methods such as injection molding, blow molding, extrusion molding, press molding, etc. Among these, injection molding is preferably used.

EXAMPLES

In the following, the present invention is explained in more detail by referring to Examples, but the present invention is not limited by these Examples.

The respective components used are as shown below.

(A) PPE:
Poly(2,6-dimethyl-1,4-phenylene ether) (produced by Nippon Polyether Co.) shown below
(a-1) Intrinsic viscosity measured at 30° C. in chloroform 0.44 dl/g
(a-2) Intrinsic viscosity measured at 30° C. in chloroform 0.33 dl/g (B) Partially hydrogenated alkenyl aromatic compound-conjugated diene block copolymer having a hydroxy group:

Partially hydrogenated one terminal hydroxy group-modified styrene-isoprene-styrene copolymer (one terminal α-hydroxy-alkylstyrene modified SEPS, produced by Kuraray Co., Ltd., trade name: HG-252): styrene content 30%, weight average molecular weight 45,000

Modified block copolymer 1:
After 8 kg of powder of a styrene-isoprene block copolymer hydrogenated product (produced by Kuraray Co., Ltd., trade name: SEPTON 2002, hereinafter referred to as "S2002"), 400 g of 2-hydroxyethyl methacrylate (hereinafter referred to as "HEMA"), 400 g of styrene and 12 g of 1,3-bis(t-butyl-peroxyisopropyl)benzene (hereinafter referred to as "BPIB") were sufficiently mixed by a super mixer, the mixture was kneaded and extruded by using a biaxial extruder (manufactured by Nippon Seikosho, trade name: TEX 44) under conditions of a setting temperature of 210° C., a screw rotary number of 250 rpm and a discharging amount of 40 kg/hr, and then pellets were obtained.

As a result of determining the HEMA content of the modified block copolymer obtained, by an infrared spectroscopic method (IR method), it was 0.2% by weight.

Modified block copolymer 2:
After 8 kg of powder of a styrene-butadiene block copolymer hydrogenated product (producedby Shell Co., trade name: Kraton G1652, hereinafter referred to as "G1652"), 400 g of HEMA, 400 g of styrene and 12 g of BPIB were sufficiently mixed by a super mixer, the mixture was kneaded and extruded by using a biaxial extruder (manufactured by Nippon Seikosho, trade name: TEX 44) under conditions of a setting temperature of 210 ° C., a screw rotary number of 250 rpm and a discharging amount of 40 kg/hr, and then pellets were obtained.

As a result of determining the HEMA content of the modified block copolymer obtained, by an infrared spectroscopic method (IR method), it was 1.5% by weight.

(C) Thermoplastic resin:
Polyamide: Polyamide 6 (PA6), relative viscosity according to JIS K 6810 2.7 (produced by Kanebo Co., trade name: MC112L)
Polybutylene terephthalate (PBT): injection molding grade (produced by Kanebo Co., PBT124)
Polystyrene (GPPS): (produced by Mitsubishi Chemical Corporation, trade name: Dialex YH565)
ABS: (produced by Asahi Kasei Co., trade name: STYLAC 121)
Polycarbonate (PC): (produced by Mitsubishi Gas Kagaku Co., trade name: Upiron S-3000)

(D) Phosphorous acid triester:
Bis(2,6-di-tert-butyl-4-methylphenyl)pentaerythritol diphosphite (produced by Asahi Denka Co., trade name: MARK PEP-36)

(E) Others
Unmodified hydrogenated styrene-isoprene-styrene copolymer (SEPS): styrene content 30%, weight average molecular weight 45,000 (produced by Kuraray Co., Ltd., trade name: SEPTON 2002)
Maleic anhydride: commercially available maleic anhydride (reagent grade)

Examples 1 to 7 and Comparative examples 1 to 7

According to the composition ratios shown in Table 1 and Table 2, the respective components were sufficiently mixed by a super mixer, and then the mixtures were kneaded and extruded by using a biaxial extruder (manufactured by Nippon Seikosho Co., trade name: TEX-44) under conditions of a setting temperature of 210° C., a screw rotary number of 250 rpm and a discharging amount of 40 kg/hr to obtain pellets. During this kneading, latter bent portions were closed tightly to prevent unreacted or reacted phosphorous acid compounds from being removed.

Examples 8 and 9

Procedures were carried out in the same manner as in the above Examples 1 to 7 except for changing the partially hydrogenated aromatic alkenyl compound-conjugated diene block copolymer of Component (B) from the one terminal α-hydroxyalkylstyrene-modified SEPS to the above-mentioned modified block copolymer 1.

Examples 10 and 11

Procedures were carried out in the same manner as in the above Examples 1 to 7 except for changing the partially hydrogenated aromatic alkenyl compound-conjugated diene block copolymer of Component (B) from the one terminal α-hydroxyalkylstyrene-modified SEPS to the above-mentioned modified block copolymer 2.

The characteristics of the compositions obtained were evaluated by preparing test pieces as described below.

Preparation of test pieces:
Test pieces were prepared by carrying out injection molding at a cylinder temperature of 260° C. and a mold-cooling temperature of 80° C. by using an in-line screw type injection molding machine (IS-90B Model manufactured by Toshiba Kikai Seisakusho).

After the test pieces obtained by injection molding were placed in a desiccator immediately after molding and left to stand at 23° C. for 4 to 6 days, evaluation tests were carried out by the following method, and the results are shown in Table 1 and Table 2.

(1) Flexural modulus: it was measured by using an Instron tester according to the ASTM D790 three-point bending test.

(2) Impact resistant strength: it was measured by using an Izod impact tester (manufactured by Toyo Seiki Seisakusho Co.) according to ISO R180-1969 (JIS K 7110) Izod impact strength with notch.

(3) Heat distortion temperature: it was measured with a load of 4.6 kg by using a HDT tester (manufactured by Toyo Seiki Seisakusho Co.) according to JIS K 7207.

The results are shown in Table 1 and Table 2.

As can be clearly seen from the above results, it was confirmed that the PPE type resin compositions of the present invention contain a partially hydrolyzed aromatic alkenyl compound-conjugated diene block copolymer having a hydroxy group so that they are excellent in moldability, rigidity, heat resistance and impact resistant strength, particularly excellent in impact resistant strength.

Utilizability in Industry

As described above, the PPE type resin composition of the present invention is a thermoplastic resin composition which has significantly improved compatibility of Component (A) and Component (B) and can provide a molded product having high toughness and also excellent balance of

TABLE 1

| Formulation composition (part by weight) | Example | | | | | | | | | | |
|---|---|---|---|---|---|---|---|---|---|---|---|
| | 1 | 2 | 3 | 4 | 5 | 6 | 7 | 8 | 9 | 10 | 11 |
| (A) (a-1) | 80 | — | 35 | 30 | 40 | 70 | 30 | 80 | 80 | 30 | 30 |
| (a-2) | — | 80 | — | — | — | — | — | — | — | — | — |
| (B) One terminal hydroxy group-modified SEPS | 20 | 20 | 10 | 10 | 10 | 10 | 10 | — | — | — | — |
| Modified block copolymer 1 | — | — | — | — | — | — | — | 20 | — | 10 | — |
| Modified block copolymer 2 | — | — | — | — | — | — | — | — | 20 | — | 10 |
| (C) PA | — | — | 55 | — | — | — | — | — | — | — | — |
| PBT | — | — | — | 60 | — | — | 55 | — | — | 60 | 60 |
| GPPS | — | — | — | — | 50 | — | — | — | — | — | — |
| ABS | — | — | — | — | — | 20 | — | — | — | — | — |
| PC | — | — | — | — | — | — | 5 | — | — | — | — |
| (D) PEP36 | — | — | 0.3 | 1 | 0.5 | 0.3 | 1 | — | — | 1 | 1 |
| Maleic anhydride | — | — | 1 | — | — | — | — | — | — | — | — |
| Evaluation results | | | | | | | | | | | |
| Flexural modulus, 23° C. (kg/cm$^2$) | 18,500 | 18,000 | 22,100 | 21,500 | 21,900 | 21,000 | 21,000 | 18,000 | 17,900 | 21,200 | 21,800 |
| Izod impact strength 23° C. (kg · cm/cm$^2$) | 61 | 54 | 68 | 56 | 44 | 68 | 66 | 38 | 43 | 40 | 29 |
| Heat distortion temperature 4.6 kgf (°C.) | 175 | 169 | 173 | 168 | 120 | 125 | 167 | 174 | 175 | 164 | 168 |

TABLE 2

| Formulation composition (part by weight) | Comparative example | | | | | | |
|---|---|---|---|---|---|---|---|
| | 1 | 2 | 3 | 4 | 5 | 6 | 7 |
| (A) (a-1) | 80 | — | 35 | 30 | 40 | 70 | 30 |
| (a-2) | — | 80 | — | — | — | — | — |
| (B) One terminal hydroxy group-modified SEPS | — | — | — | — | — | — | — |
| (C) PA | — | — | 55 | — | — | — | — |
| PBT | — | — | — | 60 | — | — | 55 |
| GPPS | — | — | — | — | 50 | — | — |
| ABS | — | — | — | — | — | 20 | — |
| PC | — | — | — | — | — | — | 5 |
| (D) PEP36 | — | — | 0.3 | 1 | 0.5 | 0.3 | 1 |
| SEPS | 20 | 20 | 10 | 10 | 10 | 10 | 10 |
| Maleic anhydride | — | — | 1 | — | — | — | — |
| Evaluation results | | | | | | | |
| Flexural modulus, 23° C. (kg/cm$^2$) | 17,300 | 17,000 | 23,000 | 22,000 | 22,600 | 21,500 | 22,000 |
| Izod impact strength 23° C. (kg cm/cm$^2$) | 23 | 15 | 29 | 16 | 7 | 32 | 25 |
| Heat distortion temperature 4.6 kgf (°C.) | 179 | 173 | 177 | 170 | 121 | 125 | 170 |

We claim:

1. A polyphenylene ether resin composition which comprises:

(A) 50 to 99.5 parts by weight of a polyphenylene. ether (B) 0.5 to 50 parts by weight of a partially hydrogenated aromatic alkenyl compound-conjugated diene block copolymer having a hydroxy group based on the total amount of Components (A) and (B) being 100 parts by weight, (C) 0 to 950 parts by weight of a thermoplastic resin other than the above (A) and (B) and (D) 0 to 10 parts by weight of a phosphorous acid triester.

2. The polyphenylene ether resin composition according to claim 1, which comprises:

(A) 70 to 99 parts by weight of a polyphenylene ether (B) 1 to 30 parts by weight of a partially hydrogenated aromatic alkenyl compound-conjugated diene block copolymer having a hydroxy group based on the total amount of Components (A) and (B) being 100 parts by weight, (C) 25 to 850 parts by weight of a thermoplastic resin other than the above (A) and (B) and (D) 0.1 to 8 parts by weight of a phosphorous acid triester.

3. The polyphenylene ether resin composition according to claim 1, which comprises:

(A) 75 to 99 parts by weight of a polyphenylene ether (B) 1 to 25 parts by weight of a partially hydrogenated aromatic alkenyl compound-conjugated diene block copolymer having a hydrory group based on the total amount of Components (A) and (B) being 100 parts by weight, (C) 40 to 800 parts by weight of a thermoplastic resin other than the above (A) and (B) and (D) 0.5 to 5 parts by weight of a phosphorous acid triester.

4. The polyphenylene ether resin composition according to claim 1, wherein the aromatic alkenyl compound of Component (B) is at least one selected from the group consisting of styrene, paramethylstyrene, α-methylstyrene, vinyltoluene and vinylxylene, and the conjugated diene is 1,3-butadiene, isoprene or a mixture thereof.

5. The polyphenylene ether resin composition according to claim 1, wherein Component (B) is a partially hydrogenated aromatic alkenyl compound-conjugated diene copolymer modified with at least one selected from the group consisting of 2-hydroxyethyl acrylate, 2-hydroxyethyl methacrylate, α-hydroxypropylstyrene and α-hydroxybutylstyrene.

6. The polyphenylene ether resin composition according to claim 1, wherein Component (B) is an one terminal hydroxy group-modified partially hydrogenated aromatic alkenyl compound-conjugated diene copolymer.

7. The polyphenylene ether resin composition according to claim 1, wherein Component (B) is an one terminal hydroxy group-modified partially hydrogenated styrene-isoprene copolymer.

8. The polyphenylene ether resin composition according to claim 1, wherein Component (C) is at least one selected from the group consisting of a polyamide, a polyolefin, a saturated polyester, a styrene resin and a polycarbonate.

9. The polyphenylene ether resin composition according to claim 1, wherein Component (C) is at least one selected from the group consisting of a polyamide, a saturated polyester and a styrene resin.

10. The polyphenylene ether resin composition according to claim 1, wherein Component (D) is represented by the following formula (I).

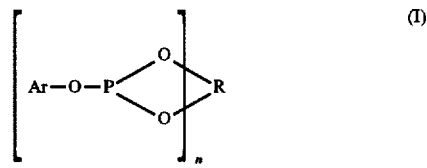

(wherein n represents 1 or 2, Ar represents an unsubstituted or substituted aryl group having 6 to 30 carbon atoms, and when n is 2, Ars may be the same or different, respectively. R represents an alkylene group having 2 to 18 carbon atoms or an arylene group when n is 1 and represents an alkanetetrayl group having 4 to 18 carbon atoms when n is 2. Also, Ar and R may contain an oxygen atom, a nitrogen atom, a sulfur atom or a halogen atom).

11. The polyphenylene ether resin composition according to claim 1, wherein Component (D) is at least one selected from the group consisting of bis(nonylphenyl) pentaerythritol diphosphite, bis(2,4-di-tert-butylphenyl) pentaerythritol diphosphite and bis(2,6-di-tert-butyl-4-methylphenyl)pentaerythritol diphosphite.

* * * * *

UNITED STATES PATENT AND TRADEMARK OFFICE
CERTIFICATE OF CORRECTION

PATENT NO. : 5,717,014
DATED : February
INVENTOR(S) : Ichiro OHKAWACHI et al.

It is certified that error appears in the above-identified patent and that said Letters Patent is hereby corrected as shown below:

On the title page, Item [30], Foreign Application Priority Data should read:

--[30]     Foreign Application Priority Data
May 25, 1994    [JP]    Japan................6-111227--

Signed and Sealed this

Fifth Day of May, 1998

Attest:

BRUCE LEHMAN

Attesting Officer    Commissioner of Patents and Trademarks

REEXAMINATION CERTIFICATE (4143rd)

United States Patent [19]
Ohkawachi et al.

[11] B1 5,717,014
[45] Certificate Issued Aug. 29, 2000

[54] POLYPHENYLENE ETHER RESIN COMPOSITION

[75] Inventors: Ichiro Ohkawachi; Kiyoji Takagi; Koji Nishida, all of Yokkaichi, Japan

[73] Assignee: Mitsubishi Chemical Corporation, Tokyo, Japan

Reexamination Request:
No. 90/005,538, Nov. 1, 1999

Reexamination Certificate for:
Patent No.: 5,717,014
Issued: Feb. 10, 1998
Appl. No.: 08/737,596
Filed: Nov. 25, 1996

Certificate of Correction issued May 5, 1998.

[22] PCT Filed: May 19, 1995
[86] PCT No.: PCT/JP95/00960
§ 371 Date: Nov. 25, 1996
§ 102(e) Date: Nov. 25, 1996
[87] PCT Pub. No.: WO95/32244
PCT Pub. Date: Nov. 30, 1995

[30] Foreign Application Priority Data
May 25, 1997 [JP] Japan .................................. 6-111227

[51] Int. Cl.[7] .............................. C08K 5/49; C08K 5/524
[52] U.S. Cl. ........................ 524/118; 524/117; 524/119; 524/120; 524/128; 524/147; 524/148; 524/149; 524/151; 524/153; 524/505
[58] Field of Search ..................... 524/117, 118, 524/119, 120, 128, 147, 148, 149, 151, 153, 505

[56] References Cited

FOREIGN PATENT DOCUMENTS 5320471 12/1993 Japan .

OTHER PUBLICATIONS

Translation of JP5320471, Dec. 1993, Imai et al., pp. 15–22, 24, and 25.

*Primary Examiner*—Judy M. Reddick

[57] ABSTRACT

A polyphenylene ether resin composition containing the following Components (A) to (D) according at the following formulation ratio.

(A) 50 to 99.5 parts by weight of a polyphenylene ether
(B) 0.5 to 50 parts by weight of a partially hydrogenated aromatic alkenyl compound-conjugated diene block copolymer having a hydroxy group and based on 100 parts by weight of the above resin composition,
(C) 0 to 950 parts by weight of a thermoplastic resin and
(D) 0 to 10 parts by weight of a phosphorous acid triester.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 3, 4, 5, 6, 7, 8, 9, 10 and 11 are cancelled.

* * * * *